April 19, 1960      P. C. HANLON      2,932,900
AXIAL PLAY GAUGE FOR BEARINGS
Filed Dec. 30, 1955      3 Sheets-Sheet 1

INVENTOR.
PAUL C. HANLON
BY
ATTORNEYS

April 19, 1960 P. C. HANLON 2,932,900
AXIAL PLAY GAUGE FOR BEARINGS
Filed Dec. 30, 1955 3 Sheets-Sheet 2

INVENTOR.
PAUL C. HANLON
BY
ATTORNEYS

United States Patent Office 2,932,900
Patented Apr. 19, 1960

2,932,900

AXIAL PLAY GAUGE FOR BEARINGS

Paul C. Hanlon, Yellow Springs, Ohio

Application December 30, 1955, Serial No. 556,757

15 Claims. (Cl. 33—174)

(Granted under Title 35, U.S. Code (1952), sec. 266)

The invention described herein may be manufactured and used by or for the United States Government for governmental purposes without payment to me of any royalty thereon.

This invention relates to a bearing gauge and, more particularly, to a device for measuring the axial play of bearings.

Certain standards have been defined for obtaining measurements when inspecting antifriction bearings. In this type of inspection, a predetermined load is applied against one of the rings of the bearing and its movement with respect to the other ring is measured. In order for a bearing to be considered satisfactory after an inspection, the movement of one ring with respect to the other ring of the bearing must be within a predetermined limit. The load applied against the bearing ring and the limit of the axial play depends upon the size of the bearing.

In previous devices employed for inspecting bearings, it has been necessary to employ adapters to inspect or test bearings of different sizes. This has the disadvantage of requiring a separate adapter for each different sized bearing. This, of course, increases the time required for inspecting a bearing. The present invention overcomes these disadvantages by providing a device that quickly measures bearings of varying diameter.

The primary object of the present invention is to provide a device for measuring the axial play of bearings of various sizes without the use of adapters.

Other objects of this invention will be readily perceived from the following description.

This invention relates to apparatus for determining the axial play of an outer ring of a bearing with respect to an inner ring of the bearing in which the inner ring is clamped in a stationary position by suitable means. The outer edges of the outer ring are supported for movement of the outer ring in opposite axial directions with respect to the inner ring. This movement of the outer ring with respect to the inner ring is measured by suitable means.

The attached drawings illustrate a preferred embodiment of the invention, in which Fig. 1 is a sectional view partly in elevation of the gauging apparatus of the present invention;

Figure 1:
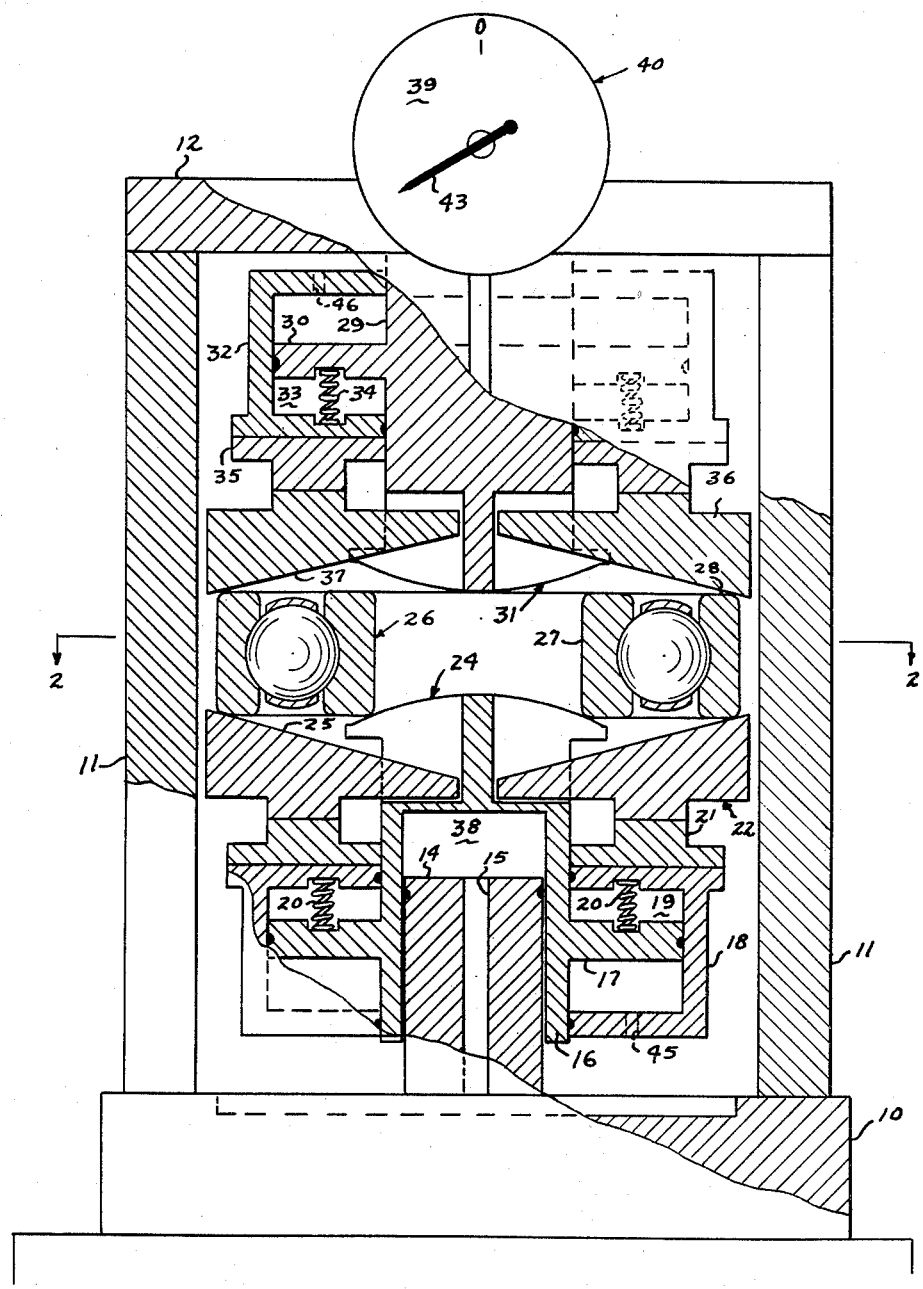

Referring to the drawings and particularly to Fig. 1, there is shown a frame having a base 10 on which is mounted a pair of upright support legs 11. A top member 12 connects the upper ends of the support legs 11 to form a unitary frame.

A cylindrical piston or element 14 is secured to the base 10 and has a passage 15 extending therethrough. A movable support member 16 surrounds the fixed cylindrical piston 14 for movement with respect thereto. The movable support member 16, which is of circular cross section, has an annular piston member or rib 17 extending radially therefrom. A movable cylinder 18 surrounds the periphery of the movable support member 16 and abuts against the periphery of the piston member 17 to form a chamber 19 between the upper edge of the piston member 17 and the bottom of the upper edge of the cylinder 18. Resilient means such as springs 20 are disposed in the chamber or compartment 19 between the piston member 17 and the cylinder 18 to transmit the motion of the support member 16 to move the cylinder 18 at the same time.

Figure 2:
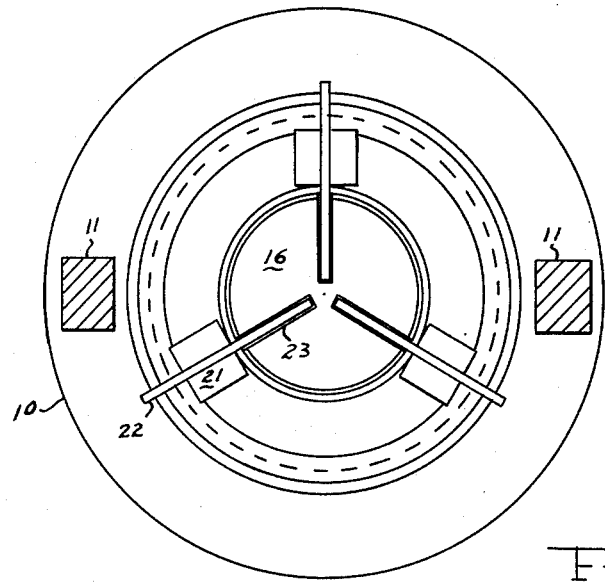
Fig. 2 is a sectional view taken along the line 2—2 of Fig. 1.
Figure 3:
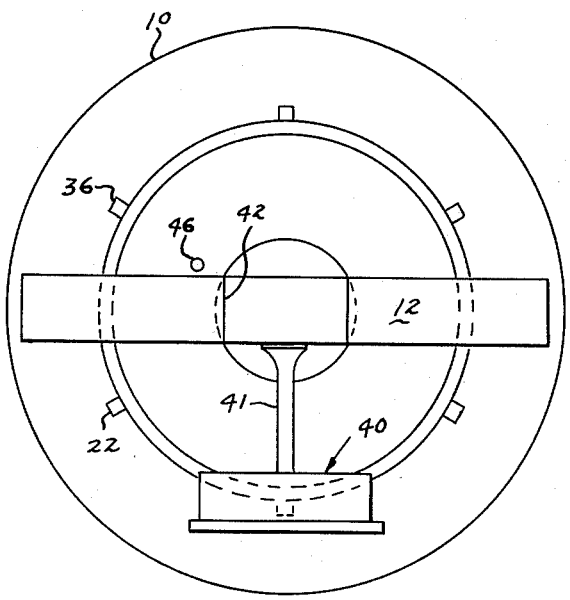
Fig. 3 is a top plan view of the apparatus of Fig. 1.

A plurality of support blocks 21 are mounted on top of the cylinder 18 with each of the support blocks having a radial finger or element 22 attached thereto. The inner ends of radial fingers 22 extend into slots 23 in the movable support member 16 (see Fig. 2). The top surface 24 of the support member or holder 16 has a curved or convex shape and is preferably in the form of a hemisphere. The surface 24 is curved for supporting bearings of varying size. The top surfaces 25 of the radial fingers 22 slope downwardly toward the support member 16 to cooperate with the surface 24 of the member 16 to permit various sized bearings to be tested by the present apparatus.

A bearing 26 having an inner ring 27 and an outer ring 28 is shown disposed between the surfaces 24 and 25 in Fig. 1 with the inner ring 27 resting on the surface 24 and the outer ring 28 resting on the surfaces 25. The surfaces 25 of the radial fingers 22 are kept in contact at all times with the outer ring 28 by the springs 20.

A stationary member 29 is secured to the top member 12 of the frame and extends downwardly therefrom. The stationary member 29, which is circular in cross section, has an annular piston member or rib 30 extending radially from the periphery thereof. The stationary member 29 has a lower surface 31 curved to accommodate bearings of various sizes. A movable cylinder 32 surrounds the stationary member 29 and is movable with respect thereto. The cylinder 32 abuts against the periphery of piston member 30 and forms a compartment or chamber 33 therebetween into which a fluid under pressure such as compressed air is introduced for moving the cylinder 32 with respect to the stationary member 29 to apply a predetermined load on the outer ring 28.

A plurality of blocks 35 is attached to the lower edge of the cylinder 32; each of the blocks 35 has a radial finger or element 36 secured thereto. The radial fingers 36 have lower surfaces 37 sloped upwardly to cooperate with the lower surface 31 of the stationary member 29 to accommodate bearings of various sizes. The surface 31 of the stationary member 29 contacts the upper inner edge of the inner ring 27 of the bearing 26 while the surface 37 of each radial finger 36 contacts the upper outer edge of the outer ring 28. Resilient means such as springs 34 are disposed in the compartment 33 to keep the surfaces 37 of radial fingers 36 in contact with the upper outer edge of the outer ring 28. The stationary member 29 has a plurality of slots therein into which the radial fingers 36 are inserted in a manner similar to that in which the radial fingers 22 fit in the slots 23 of the movable support member 16.

Considering the operation of the device for testing an antifriction bearing such as the bearing 26, the bearing is disposed with the lower inner edge of the inner ring 27 resting on the surface 24 of the movable support member 16, the lower outer edge of the outer ring 28 resting on the surfaces 25 of the radial fingers 22, and the upper outer edge of the outer ring 28 contacting surfaces 37 of radial fingers 36. Compressed air or other suitable pressurized fluid is supplied through the passage 15 into a compartment 38, which is between the cylindrical piston 14 and the movable member 16; this force moves the movable support member 16 upwardly with respect to the piston 14 until the upper inner edge of the inner ring 27 is in contact with the lower surface 31 of the stationary member 29. As the support member 16 moves upwardly, the cylinder 18 moves therewith since the springs 20 transmit the movement of the member 16 from the piston member 17. Thus, when the upper inner edge of the inner ring 27 contacts the lower surface 31 of the stationary member 29, the top surface 24 of the member 16 is in contact with the lower inner edge of the inner ring 27 and the inner ring 27 is thereby clamped between the two members 16 and 29. Since the cylinder 18 has moved with the support member 16, the surfaces 25 of the radial fingers 22 remain in contact with the lower outer edge of the outer ring 28 when the inner ring 27 is clamped between the members. The surfaces 37 of the radial fingers 36 remain in contact with the upper outer edge of the outer ring 28 due to the springs 34.

Once the inner ring 27 is clamped between the members 16 and 29, the outer ring 28 is moved in opposite axial directions by moving first the radial fingers 22 upwardly and then the radial fingers 36 downwardly or vice versa, as desired. The radial fingers 22 are moved upwardly by supplying pressurized fluid such as compressed air to the compartment 19. The distance the outer ring 28 travels with respect to the inner ring 27 when the radial fingers 22 are moved upwardly under a predetermined load, which depends on the pressure of the compressed air, is indicated on a dial 39 of a dial indicator 40. A support arm 41 extends from the dial indicator 40 and is connected to a bracket 42, which is secured to the top member 12 of the frame. A pointer 43 is connected to a pinion (not shown) that cooperates with a rack, which has a stem 44 on the end thereof in contact with the upper edge of one of the radial fingers 36. This rack is under spring pressure so that it follows either upward or downward motion of the outer ring. The exact starting point is determined by rotating the dial 39 with respect to the pointer 43. Thus, with the stem 44 resting on the upper surface of one of the radial fingers 36, the movement of the outer ring 28 with respect to the inner ring 27 is transmitted through the stem 44 to the pointer 43 and is easily observed on the dial 39 of the dial indicator 40.

The compressed fluid within the compartment 19 is then vented and pressurized fluid such as compressed air is supplied to the compartment 33 to apply the same predetermined force in a downward direction on the outer ring 28 through the radial fingers 36. The amount of downward travel of the outer ring 28 with respect to the inner ring 27 is transmitted through the radial finger 36 and the stem 44 to the pointer 43 where it is easily observed on the indicator 40. The combined readings of the upward and downward motions of the outer ring 28 with respect to the inner ring 27 have been indicated on the dial indicator 40 and may be added to give the total movement. The compressed fluid is vented from the compartment 33 and the radial fingers 36 move upwardly to release pressure on the outer ring 28 but remain in contact therewith. An easier method of finding the total movement of the outer ring 28 with respect to the inner ring 27 may be accomplished by rotating the dial 39 to set the pointer 43 on zero after the outer ring has been moved in one of its axial directions by the predetermined load. When the outer ring is moved in the opposite axial direction in response to the predetermined load, the total movement of the outer ring with respect to the inner ring is easily observed on indicator 40. This avoids the necessity of two readings as required in the above disclosed operation.

It will be noted that the cylinder 18 has a passage 45 in its lower surface to maintain the space between the rib 17 and the lower edge of the cylinder 18 at ambient pressure and thereby prevent any pressure change therein during movement of the cylinder 18 with respect to the piston member 17. A similar passage 46 in the upper edge of the cylinder 32 performs the same function as the passage 45.

After the compartment 33 has been vented, the pressurized fluid is vented from the compartment 38 to release the inner ring 27 from its clamped position. The bearing 26 is then easily removed since the springs 20 and 34 may be easily overcome to allow the radial fingers 22 and 36 to be retracted. After the bearing is removed, another bearing of the same size or a different size may be inserted for testing and inspecting. This, of course, allows a rapid testing of antifriction bearings of varying size.

One system, which employs compressed air as the pressurized fluid, of actuating the movement of the inner and outer rings of the bearing is shown disposed in a cabinet 50 (see Fig. 4) on the top of which is mounted the gauging device of the present invention. The compressed air is supplied from a suitable source (not shown) through a pipe 51 into branches 52 and 53. The branch 52 supplies the compressed air for actuating the movable support means 16 to clamp the inner ring 27 of the bearing 26. The compressed air from the branch 52 passes through a filter 54, a lubricator 55, a regulator 56, and a line or pipe 57 into a control valve housing 58 having a control valve (not shown) therein. The control valve governs the flow of compressed air from the line 57 to the line 59, which is connected to the passage 15 in the fixed piston 14 to furnish the compressed air to the compartment 38. The control valve is actuated by a pedal 60 that either closes the line 57 or connects it with the line 59 to direct the compressed air to the compartment 38 or opens the line 59 to vent the compartment 38 of the compressed air. A gauge 61 is connected to the line 59 to indicate the pressure therein and, thus, the pressure in the compartment 38. The pressure in the line 59 is varied to produce the desired pressure by actuating a lever 62 of the regulator 56; thus, it will be observed that the clamping pressure against the inner ring 27 of the bearing 26 may be adjusted as desired.

The compressed air passing through the branch 53 of the pipe 51 supplies the motive force for actuating the movable cylinders 18 and 32. The compressed air from the branch 53 passes through a filter 63, a lubricator 64, a regulator 65, and a line 66 to a control valve housing 67. A control valve (not shown) is disposed within the housing 67 to govern the flow of compressed air from the line 66. This valve closes the line 66 or connects the line 66 with a line 68 that supplies compressed air to the compartment 19 or connects the line 66 with a line 69 that furnishes compressed air to the compartment 33 or opens either the line 68 or the line 69 to vent the compartment 19 or 33, respectively. Actuation of a pedal 70 connects the line 66 with the line 68 to supply compressed air to the compartment 19 to move the cylinder 18 upwardly and thereby move the outer ring 28 with respect to the inner ring 27. Actuation of a second pedal 71 connects the line 66 with the line 69 and simultaneously vents the compartment 19 through the line 68. The actuation of the pedal 71, of course, supplies the compressed air through the line 69 to the compartment 33 to move the cylinder 32 and thereby move the outer ring 28 downwardly with respect to the inner ring 27. The pressure in the line 68 is indicated by a gauge 72 in communication therewith; a gauge 73 in communication with the line 69 indicates the pressure therein. The pressure desired to be supplied to the compartments 19 and 33 depends on the size of the bearing since a predetermined force or load must be applied thereto. The required pressure is provided through the lines 68 and 69 by adjusting a lever 74 of the regulator 65.

Figure 4:
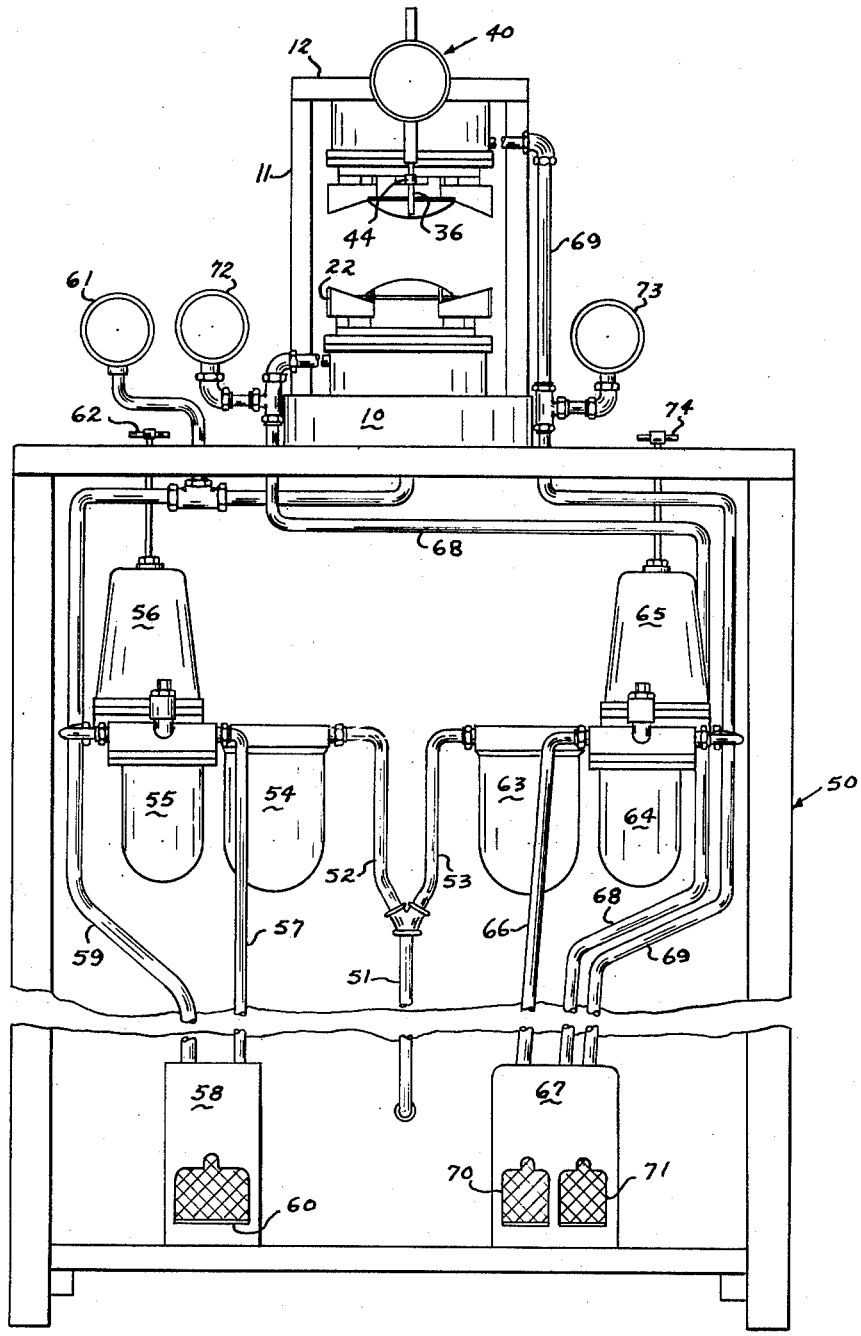
Fig. 4 is an elevational view of an actuating mechanism for the gauging device of the present invention.

Considering the operation of the gauging device with the compressed air apparatus of Fig. 4, the bearing 26 is disposed within the gauge as shown in Fig. 1. The pedal 60 is then depressed to direct compressed air through the line 59 to the compartment 38, as previously set forth. The pressure in the line 59, which is indicated by the gauge 61, is governed by actuating the lever 62 of the regulator 56 to provide the required pressure. The compressed air in the compartment 38 exerts an upward force on the movable support member 16 to clamp the inner ring 27 between the surfaces 24 and 31 of the members 16 and 29. As previously explained, the springs 20 and 34 urge the fingers 22 and 36 into contact with the outer ring 28 at all times. The stem 44 of the dial indicator 40 is set on one of the radial fingers 36 and, thus, is in contact with the outer ring 28 of the bearing. The pedal 70 is then depressed and compressed air passes through the line 68 to the compartment 19 to move the cylinder 18 and the outer ring 28 upwardly. The pressure, of course, is governed through the lever 74 of the regulator 65 in conjunction with the gauge 72. While the pedal 70 is depressed, the dial 39 of the dial indicator 40 is rotated to set the pointer 43 at zero. The pedal 70 is next released to open the line 68 and, of course, vent the compartment 19 whereby the cylinder 18 returns to its original position. The pedal 71 is then depressed to furnish compressed air through the line 69 to the compartment 33 to force the cylinder 32 and the outer ring 28 downwardly. The pressure directed to this compartment should be the same as was supplied to the compartment 18 and is checked on the gauge 73. If for some reason the pressure is not the same, the lever 74 of the regulator 65 is employed to give the required pressure. With the pedal 71 depressed, the axial play of the bearing, which is the movement of the outer ring with respect to the inner ring, is shown on the dial indicator 40. The pedal 71 is then released to vent the compartment 33 through the line 69 to release the predetermined load on the outer ring 28. The pedal 60 is next released to vent the compartment 38 through the line 59. This results in the support member 16 moving downwardly due to its weight to release the inner ring 27 from its clamped position between the members 16 and 29. The bearing 26 is then removed and another bearing may be inserted with the same steps being repeated.

It will be understood that the gauging device of the present invention will test antifriction bearings, such as ball bearings and roller bearings, and plain spherical bearings. It also will be understood that the springs 20 and 34 could be removed from the compartments 19 and 33 but the radial fingers would then slap against the outer ring when the cylinders were moved. Thus, it will be seen that the springs insure that the fingers do not slap against the outer ring since they are already in contact therewith. The springs are so designed that they tend to push the movable cylinders and adjust the radial fingers thereon to accommodate the smallest possible bearing; the springs retract to allow insertion of a bearing of larger size in the gauge.

One advantage of this invention is that a greater accuracy is obtained since no levers or moving joints are used because the dial indicator stem contacts the outer ring of the bearing directly through the radial fingers rather than through any levers or moving joints. Another advantage of this invention is that the gauging loads are set accurately and quickly without the use of weights or levers.

A further advantage of this invention is that the hands of the operator are free for loading or unloading the bearing; this not only produces a quicker operation but also a safer operation. Still another advantage of this invention is that the axial play of bearings of various sizes may be measured rapidly and accurately.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. Apparatus for determining the axial play of an outer ring of a bearing with respect to an inner ring of the bearing comprising a frame, a stationary member mounted on the frame, a movable support member mounted on the frame, said stationary and movable members contacting the upper and lower inner edges of the inner ring of the bearing to clamp the bearing therebetween in a stationary position to prevent axial movement of the inner ring, movable means surrounding said stationary member, movable means surrounding said movable member, means mounted on each of said movable means for contacting one of the outer edges of the outer ring, means to apply a predetermined axial force in one direction on the outer ring through one of said outer ring contact means, means to apply a predetermined axial force in the opposite direction on the outer ring through the other of said outer ring contact means, and means contacting the outer ring contact means for measuring the axial movement of the outer ring with respect to the inner ring.

2. Apparatus according to claim 1 in which each of said stationary and movable members has a curved surface to contact bearings of varying diameter.

3. Apparatus according to claim 1 in which each of said stationary and movable members has a convex surface to contact bearings of varying diameter.

4. Apparatus according to claim 1 in which said stationary and movable members and said outer ring contact means have cooperating surfaces to engage bearings of varying diameter.

5. Apparatus for determining the axial play of an outer ring of a bearing with respect to an inner ring of the bearing comprising a frame, a stationary member mounted on the frame, a movable support member mounted on the frame, said stationary and movable members contacting the upper and lower inner edges of the inner ring of the bearing to clamp the bearing therebetween in a stationary position to prevent axial movement of the inner ring, said stationary member having a rib extending therefrom, said movable member having a rib extending therefrom, movable means surrounding said stationary member including its rib and contacting one of the outer edges of the outer ring, movable means surrounding said movable member including its rib and contacting the other of the outer edges of the outer ring, resilient means disposed between each of said ribs and each of said movable means to urge the movable means into continuous contact with the outer edges of the outer ring, means to apply a predetermined axial force in one direction on said outer ring through one of said movable means, means to apply a predetermined axial force in the opposite direction on said outer ring through the other of said movable means, and means contacting one of said movable means for measuring the axial movement of said outer ring with respect to said inner ring.

6. Apparatus according to claim 5 in which each of said stationary and movable members has a curved surface to contact bearings of varying diameter.

7. Apparatus according to claim 5 in which each of said stationary and movable members has a convex surface to contact bearings of varying diameter.

8. Apparatus according to claim 5 in which said stationary and movable members and said movable means have cooperating surfaces to engage bearings of varying diameter.

9. Apparatus for determining the axial play of an outer ring of a bearing with respect to an inner ring of the bearing comprising a frame, a stationary member having a substantially circular cross section mounted on the frame, a movable support member having a substantially circular cross section mounted on the frame, said stationary and movable members contacting the upper and lower inner edges of the inner ring in the bearing to clamp the bearing therebetween in a stationary position to prevent axial movement of the inner ring, said stationary member having an annular rib extending radially therefrom, said movable member having an annular rib extending radially therefrom, movable means surrounding said stationary member and its rib and contacting an outer edge of the outer ring, movable means surrounding the movable member and its annular rib and contacting the other of the outer edges of the outer ring, each of said movable means and said cooperating rib being spaced from each other to form a chamber therebetween, resilient means disposed in the chamber between each of said ribs and each of said movable means to urge the movable means into continuous contact with the outer edges of the outer ring, means to supply a fluid under pressure to one of said chambers to apply a predetermined axial force in one direction on the outer ring through said movable means forming said one chamber, means to supply a fluid under pressure to the other of the chambers to apply a predetermined axial force in the opposite direction on the outer ring through said movable means forming said other chamber, and means contacting one of the movable means for measuring the axial movement of the outer ring with respect to the inner ring.

10. Apparatus according to claim 9 in which each of said stationary and movable members has a curved surface to contact bearings of varying diameter.

11. Apparatus according to claim 9 in which each of said stationary and movable members has a convex surface to contact bearings of varying diameter.

12. Apparatus according to claim 9 in which said stationary and movable members and said movable means have cooperating surfaces to engage bearings of varying diameter.

13. Apparatus for determining the axial play of an outer ring of a bearing with respect to an inner ring of the bearing comprising a frame, a stationary member mounted on the frame, a movable support member mounted on the frame, said stationary and movable members contacting the upper and lower inner edges of the inner ring of the bearing to clamp the bearing therebetween in a stationary position to prevent axial movement of the inner ring, a movable cylinder surrounding said stationary member, a movable cylinder surrounding said movable member, means mounted on each of said movable cylinders for contacting one of the outer edges of the outer ring, means to apply a predetermined axial force in one direction on said outer ring through one of said outer ring contact means, means to apply a predetermined axial force in the opposite direction on said outer ring through the other of said outer ring contact means, and means contacting the outer ring contact means for measuring the axial movement of the outer ring with respect to the inner ring.

14. Apparatus for determining the axial play of an outer ring of a bearing with respect to an inner ring of the bearing comprising a frame, a stationary member mounted on the frame, a movable support member mounted on the frame, said stationary and movable members contacting the upper and lower inner edges of the inner ring of the bearing to clamp the bearing therebetween in a stationary position to prevent axial movement of the inner ring, movable means surrounding said stationary member, movable means surrounding said movable member, a plurality of radial fingers mounted on each of said movable means for contacting one of the outer edges of the outer ring, means to apply a predetermined axial force in one direction of said outer ring through the plurality of radial fingers contacting one of the outer edges of the outer ring, means to apply a predetermined axial force in the opposite direction on said outer ring through the plurality of radial fingers contacting the other outer edge of the outer ring, and means contacting one of the radial fingers for measuring the axial movement of the outer ring with respect to the inner ring.

15. Apparatus for determining the axial play of an outer ring of a bearing with respect to an inner ring of the bearing comprising means for fixedly holding the inner ring at its upper and lower inner edges, radial fingers for contacting the outer ring at its upper outer edge, radial fingers for contacting the outer ring at its lower outer edge, means to apply a predetermined axial force in one direction on the outer ring through the radial fingers contacting one of the outer edges, means to apply a predetermined axial force in the opposite direction on the outer ring through the radial fingers contacting the other of the outer edges, said inner ring holding means and said radial fingers having cooperating surfaces to engage bearings having inner and outer rings of varying diameters, and means for indicating the axial movement of the outer ring with respect to the inner ring.

References Cited in the file of this patent

UNITED STATES PATENTS

| | | |
|---|---|---|
| 1,062,566 | Gohlke | May 20, 1913 |
| 2,059,407 | Spase | Nov. 3, 1936 |
| 2,170,493 | Clapper | Aug. 22, 1939 |
| 2,540,767 | Tabbert | Feb. 6, 1951 |
| 2,687,575 | Acton | Aug. 31, 1954 |
| 2,746,159 | Aller | May 22, 1956 |
| 2,767,477 | Esken | Oct. 23, 1956 |

FOREIGN PATENTS

| | | |
|---|---|---|
| 802,103 | Germany | Feb. 1, 1951 |